US006965384B2

(12) United States Patent
Lui et al.

(10) Patent No.: US 6,965,384 B2
(45) Date of Patent: *Nov. 15, 2005

(54) IN-SITU DIGITAL INKING FOR APPLICATIONS

(75) Inventors: Charlton E. Lui, Redmond, WA (US); Justin Garrett Tolmer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/023,370

(22) Filed: Dec. 29, 2004

(65) Prior Publication Data

US 2005/0111014 A1 May 26, 2005

Related U.S. Application Data

(63) Continuation of application No. 10/206,597, filed on Jul. 29, 2002, now Pat. No. 6,867,786.

(51) Int. Cl.[7] .............................. G09G 5/00; G06K 5/56
(52) U.S. Cl. ...................... 345/619; 345/173; 345/179; 345/180; 382/202
(58) Field of Search ................................ 345/619, 629, 345/173, 179–182; 382/202

(56) References Cited

U.S. PATENT DOCUMENTS

| 5,465,325 | A | 11/1995 | Capps et al. |
| 5,801,701 | A | 9/1998 | Koppolu et al. |
| 6,005,573 | A | 12/1999 | Beyda et al. |
| 6,115,024 | A | 9/2000 | Hayama |
| 6,268,924 | B1 | 7/2001 | Koppolu et al. |
| 6,393,135 | B1 | 5/2002 | Girardi et al. |
| 6,499,043 | B1 | 12/2002 | Forcier |
| 6,867,786 | B2 * | 3/2005 | Lui et al. ................. 345/619 |
| 2002/0136462 | A1 | 9/2002 | Hebert |
| 2003/0146907 | A1 | 8/2003 | Boals et al. |

OTHER PUBLICATIONS http://www.ritemail.net/rm/rm_email_body.asp; "Viewing Messages"; p. 1, Apr. 2002.
http://www.ritemail.net/rm/rm_condensed.asp; "Condensed ink format", p. 1, Apr. 2002.
http://www.ritemail.net/rm/rmprodinfo.asp; "Product Info", pp. 1-3, Apr. 2002.
http://www.pi.parascript.com/piweb/technology/images/rm_architecture.gif; "riteMail architecture", p. 1, Apr. 2002.
http://www.ritemail.net/rm/ce-qsg/recv_reply.asp; "Quick Start Guide—riteMail for Pocket PC",. pp. 1-2, Apr. 2002.
http://www.eskrawl.com/index.html; "Welcome to eSkrawl", total of 7 pages , Apr. 2002.
http://ritemail.net/rm/rm-qsg/howdoes.asp, "Quick Start Guide—riteMail for desktops", p. 1, Apr. 2002.
http://ritemail.net/rm/rm-qsg/recview.asp, "Quick Start Guide—riteMail for desktops", pp. 1-2, Apr. 2002.
http://www.ritemail.net/rm/ce-qsg/create.asp, "Quick Start Guide—riteMail for Pocket PC", pp. 1-4, Apr. 2002.

* cited by examiner

Primary Examiner—Matthew C. Bella
Assistant Examiner—Wesner Sajous
(74) Attorney, Agent, or Firm—Banner & Witcoff, Ltd.

(57) ABSTRACT

A digital ink environment is provided for non-native ink application programs to create independent ink services for sharing between different application programs and transmission. The digital ink environment is provided for interacting with embedded or linked ink words or other ink data in a compound ink document. The user is provided with the freedom to input digital ink so they can write anywhere in the ink environment, in any orientation, and using any desired stroke size provided by the ink environment. The ink environment is provided in an activated state for in-situ user interaction and manipulation in a computing environment, for example a pen-based environment.

12 Claims, 13 Drawing Sheets

IN-SITU DIGITAL INKING FOR APPLICATIONS

CROSS-REFERENCE TO RELATED APPLICATION

This application is a continuation of U.S. patent application Ser. No. 10/206,597, filed Jul. 29, 2002 now U.S. Pat. No. 6,867,786 which is expressly incorporated by reference.

FIELD OF THE INVENTION

Aspects of the present invention are directed generally to apparatus and methods for controlling a graphical user interface (GUI). Specifically, aspects of the present invention relate to systems and methods to allow users to manipulate electronic or digital ink for applications.

BACKGROUND OF THE INVENTION

The use of graphical user interfaces has created a revolution in the field of computers. Instead of having to memorize arcane commands, the user can now manipulate software applications by controlling graphical objects representing their various functions and components. Conventional computer systems, especially computer systems using graphical user interface (GUI) systems accept user input from one or more discrete input devices, such as a keyboard for entering text, and a pointing device, such as a mouse with one or more buttons, for operating the user interface. The keyboard and mouse interface provides for fast creation and modification of documents, spreadsheets, database fields, drawings, photos and the like.

One common use of conventional computers and GUIs is to generate and edit electronic documents. These electronic documents can contain text (e.g., electronic word processors), which are displayed on the user's screen for editing. Typical mobile workers spend a significant amount of time gathering and distributing information on paper. A significant disparity, however, exists between the flexibility provided by the keyboard and mouse interface compared with non-computer pen and paper. Whether it's a phone number, a tentative date for the next meeting, or notes on a presentation, workers may spend many hours manually transcribing and merging handwritten information in traditional programs, such as word processing programs.

Introduction of pen-based computing devices has significantly changed the traditional view of the GUI, and the manner in which users can interact with their computers. One type of pen-based computing devices includes a personal computer in a Tablet form factor. While there are a number of designs, a pen-based computing device is generally interacted by user by way of a physical writable surface and a writing implement. The writable surface may be a display surface or a writing pad. Rather than a standard keyboard or mouse interface, the navigation and control of the GUI occurs via the writing implement. While pen-based computing devices have been helpful, the transition to a computer-based note taking or other applications for these mobile workers may prove difficult indeed. Conventional application programs, such as word processors, spreadsheet programs, database programs, electronic mail programs, and the like for the traditional GUIs may not effectively provide a user with the flexible of a pen-based computing environment.

Conventional applications programs are typically text centric. For example, traditional word processing and electronic mail programs typically requires a user to type into a keyboard and the programs typically arrange the typed text in uniform rows of across the user's screen. There is no convenient or flexible way to naturally take notes in an electronic form for a mobile user, but at the same ease the transition to a pen-based environment and provide the ability to preserve the investment in text centric applications.

Accordingly, there is a need for a flexible writing environment for a user to work with different applications.

SUMMARY OF THE INVENTION

Aspects of the present invention pertain to a digital ink environment for application programs that solves one or more problems mentioned above. In one aspect, an ink environment is provided by interacting with embedded or linked ink words or other ink data of a container ink object. The ink environment is made accessible to the user through menus and a window of an application program that operates with the container ink object. Accordingly, a user is provided with the flexibility and freedom to input digital ink so they can write anywhere in the ink environment, in any orientation, and using any desired stroke size provided by the ink environment. In one aspect, the ink environment is provided in an activated state for in-situ user interaction and manipulation in a computing environment, for example a pen-based environment. In one aspect, the ink environment is enabled with the ink menu items that are assimilated with the menus of the application that implements the compound ink document. In various aspects, a system provides an ink environment in an Object Linking and Embedding environment, including component object model services that an application can use to capture, manipulate, and store ink. Advantageously, the ink environment can be provided to non-native ink applications to create independent ink services for sharing between different applications and transmission over networks to remote users. In some aspects of the present invention, a metafile is provided with antialiasing support to improve the visual appearance of ink.

The above and other aspects, features and advantages of the present invention will be readily apparent and fully understood from the following detailed description in conjunction with the accompanying drawings, which are included by way of example, and not by way of limitation with regard to the claimed invention.

DETAILED DESCRIPTION

Figure 1:
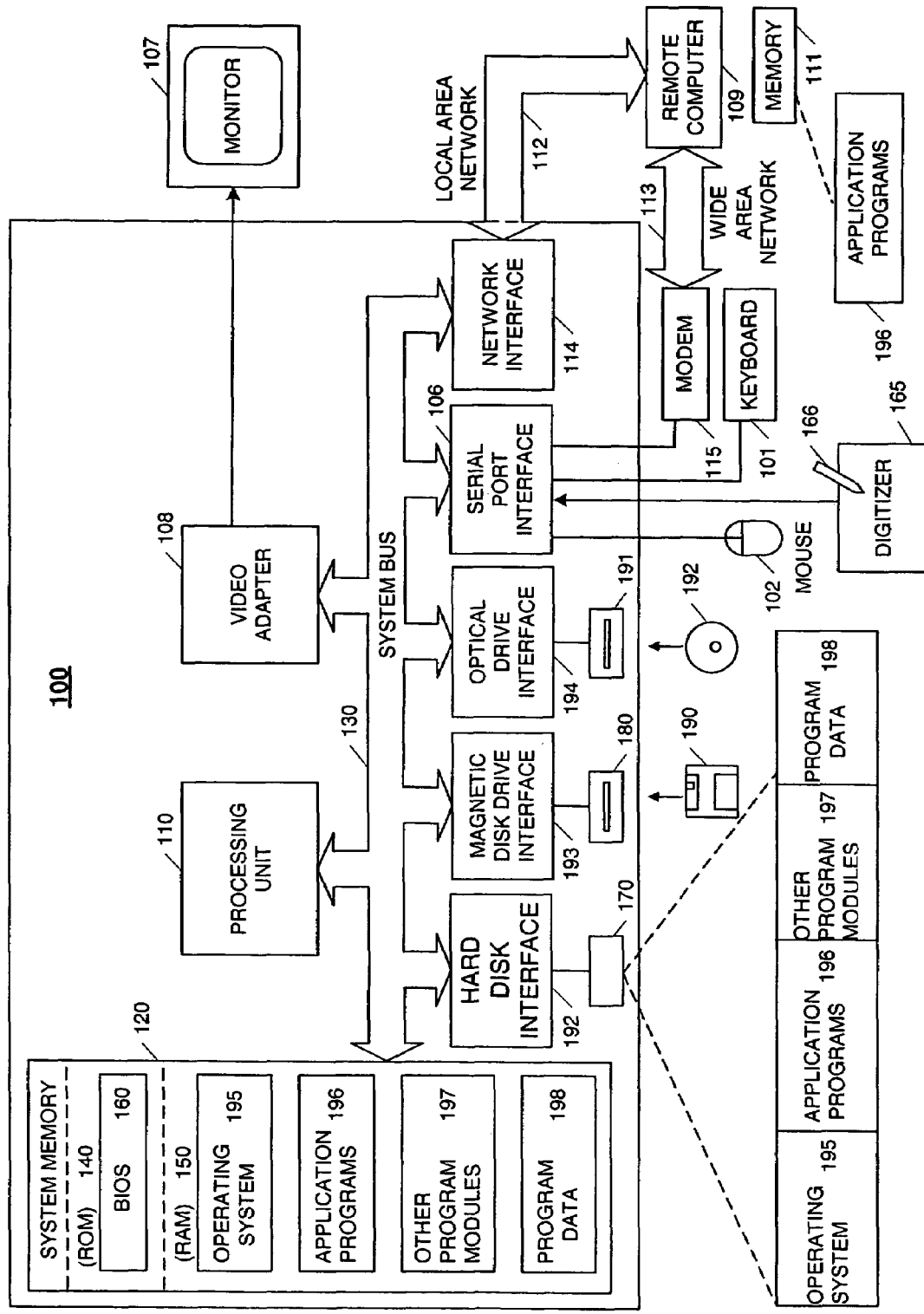
FIG. 1 is a functional block diagram of a general-purpose digital computing environment in which one or more aspects of the present invention may be implemented.

The following description is divided into sub-sections to assist the reader. The sub-sections include: Terms; Overview; General Computing Environment; Illustrative Ink Environment; Illustrative System Environment; Ink Environment Behaviors; Rendering Ink; Ink Environment Insertion; and Example Use of Ink Environment.

Terms

As used herein the term "stroke" refers to a sequence or set of captured points. For example, when rendered, the sequence of points may be connected with lines. Alternatively, a stroke may be represented as a point and a vector in the direction of the next point. In short, a stroke is intended to encompass any representation of points or segments relating to ink, irrespective of the underlying representation of points and/or what connects the points.

As used herein the term "ink" refers to a sequence or a set of handwritten strokes. For example, the handwritten stokes might represents characters including written language or symbols, such as drawings made by a user and may be combined with properties.

As used herein the term "point" refers to information defining a location in predefined space. For example, a point may be defined relative to a capturing space (for example, points on a digitizer) and/or a display space (the points or pixels of a display device). Points may be represented using a variety of known techniques including two dimensional Cartesian coordinates, polar coordinates, three dimensional coordinates, four dimensional coordinates, and other techniques as known in the art.

As used herein the terms "ink word" refers to one or more handwritten strokes captured by systems according to the teaching of the invention. Each stroke in an ink word has a location associated with the stroke.

As used herein the terms "text word" refers to machine-generated text. Text words may be introduced into the systems of the invention in any suitable manner, such as by an input device (e.g., a keyboard), by downloading (e.g., from memory or a network connection), by selecting from a menu, or from input ink words converted to machine-generated text via handwriting recognition software.

Overview

As will be discussed in detail below, the present invention in one aspect provides a digital ink environment for interacting with embedded or linked ink words or other ink data in a compound ink document. The ink environment is made accessible to the user through the window environment (menus and windows) of an application that operates with the compound ink document. The user is provided with the freedom to input digital ink so they can write anywhere in the ink environment, in any orientation, and using any desired stroke size provided by the ink environment. In one aspect, the ink environment is provided in an activated state for in-situ user interaction and manipulation in a computing environment, for example a pen-based environment. In one aspect, the ink environment is enabled with the ink menu items that are assimilated with the menus of the application that implements the compound ink document. In various embodiments, a system provides an ink environment in an OLE (Object Linking and Embedding) environment, including component object model (COM) services that an application can use to capture, manipulate, and store ink. Advantageously, the ink environment can be provided to non-native ink applications to create independent ink services for sharing between different applications and transmission over networks to remote users. In other embodiments, the ink environment may be provided by an ACTIVEX® control. In one aspect of the present invention, a metafile is provided with antialiasing support to improve the visual appearance of ink.

General Computing Environment

The ink environment of the present invention may be described in the general context of computer-executable instructions, such as program modules, executed by one or more computers or other devices. FIG. 1 is a schematic diagram of an illustrative general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
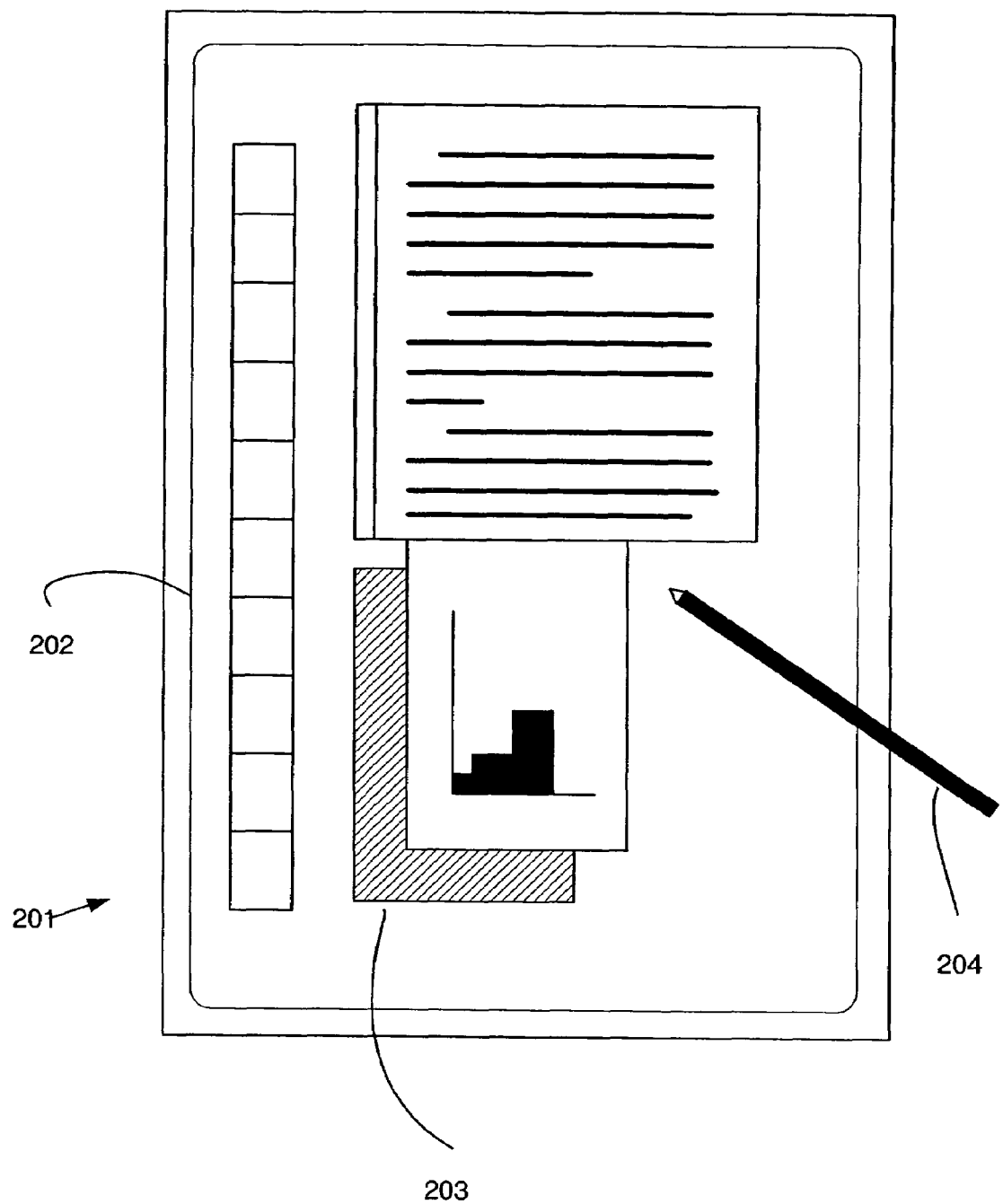
FIG. 2 is a schematic diagram of a pen-based computing environment in which one or more aspects of the present invention may be implemented.

FIG. 2 is a schematic diagram of an illustrative pen-based computing system 201 that may be used in accordance with various aspects of the present invention. Any or all of the features, subsystems, and functions in the system of FIG. 1 may be included in the computer of FIG. 2. Pen-based computing system 201 includes a large display surface 202, e.g., a digitizing flat panel display, such as a liquid crystal display (LCD) screen, on which a plurality of windows 203 is displayed. Using stylus 204, a user may select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its selection capabilities. In one example, the stylus 204 may be implemented as a "pencil" or "pen," in which one end constitutes a writing element and the other end constitutes an "eraser" end, and which, when moved across the display, indicates portions of the display to be erased. Other types of input devices, such as a mouse, trackball, or the like may be used. Additionally, a user's own finger may be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as the stylus 204.

Illustrative Ink Environment

Figure 3:
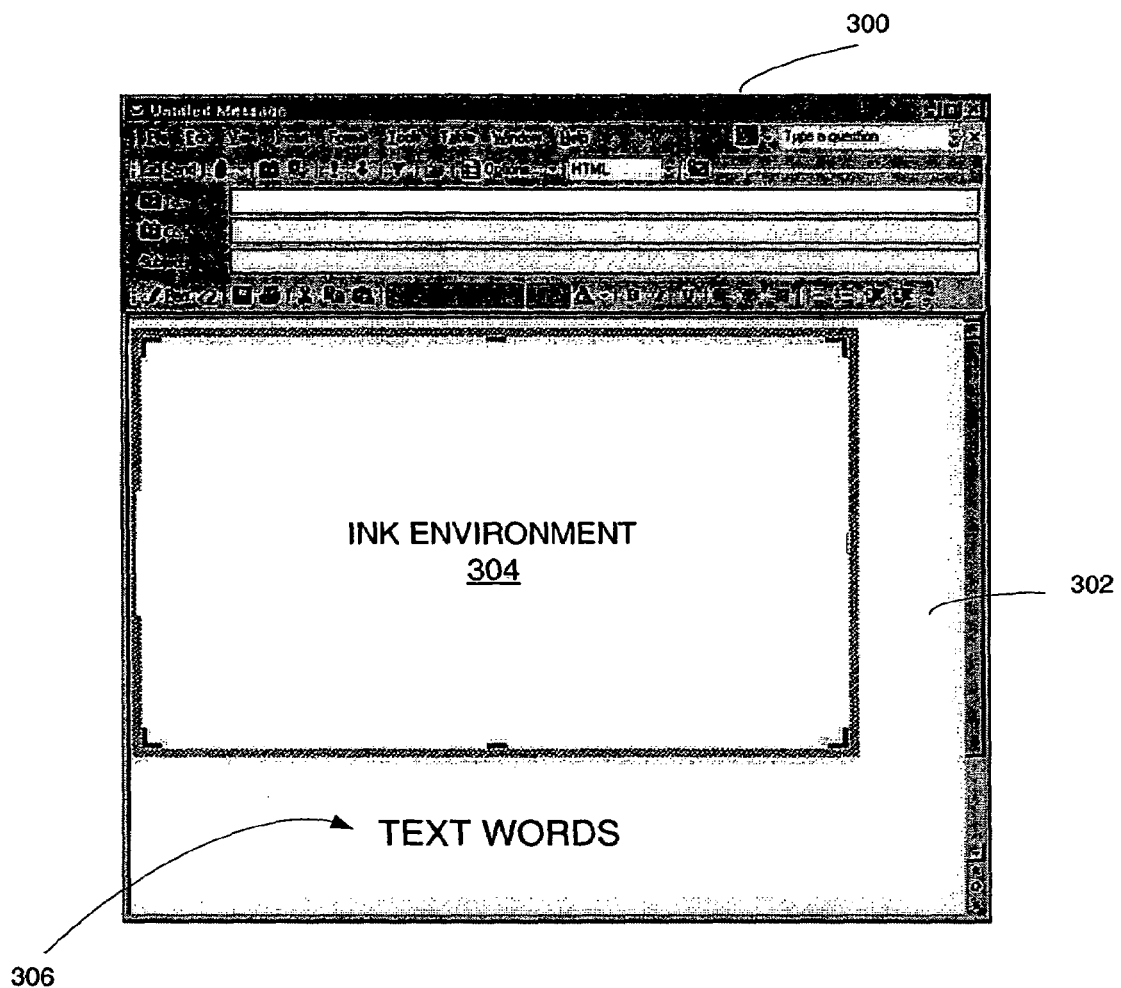
FIG. 3 is a schematic representation of an ink environment within an application program in accordance with the teachings of the present invention.

As described above, aspects of the present invention relate to systems and processes for selecting and manipulating electronic or digital ink, e.g., in pen-based computing system. As noted above, aspects of the ink environment of the present invention can be implemented within an application program. For example, FIG. 3 is a schematic diagram of one ink environment within a non-native ink application program 300 that can be used with pen-based computing system 201 or general purpose computing environment 100. A non-native ink application program, such as an electronic mail program, may have an electronic mail message body 302 which includes text words 306 and an ink environment 304 therein. In the illustration shown in FIG. 3, within the ink environment, a user is free to make strokes of ink on a pen down action which may be stylus 204 contacting the display surface 202, the click of a mouse button, the operation of a button on a trackball or joystick, or the like. The user controls an input device (such as stylus 204) and the resulting strokes continue until a pen-up action. The pen up action may be the lifting of the stylus 204 off the display surface 204, releasing or another operation of a mouse button, or the operation of the button (or other buttons) on the trackball or joystick or the like.

In one aspect, the ink environment 304 can be provided in an Object Linking and Embedding (OLE) environment developed by Microsoft Corporation®. In one embodiment, an ink server component (as an OLE server) can provide the ink environment to the application program. Object Linking and Embedding technology provides techniques which allow different application programs to cooperate together.

In one aspect of the invention, within the OLE environment, the ink environment is created as an OLE object. This ink environment can be either linked or embedded into an application so as to be "contained" within the application.

In an aspect of the invention, the container ink environment can be transmitted or otherwise accessed via a metafile between applications on a single computer, or between computers on different networks, such as the Internet. In the illustration shown in FIG. 3, the electronic mail message body 302 with the ink environment 304 and text words 306 form a compound ink document or a container ink object. Nevertheless, while an electronic mail message body is shown, a compound ink document can be created with the ink environment including text words, spreadsheet data, non-ink graphical objects, charts, graphs, audio data, video data and/or the like. Consequently, the terms "compound ink document" or "container ink object" as used herein, is intended to have a broad definition and encompasses ink with other machine data. Accordingly, the ink environment with ink words therein creates a contained ink object. In the example shown in FIG. 3, the electronic mail application program can be referred to as a "container ink application". Nevertheless, a container ink application may include a word processing program, a presentation graphics program, an electronic spreadsheet program, a messaging and collaboration program, and the like.

Illustrative System Environment

Figure 4:
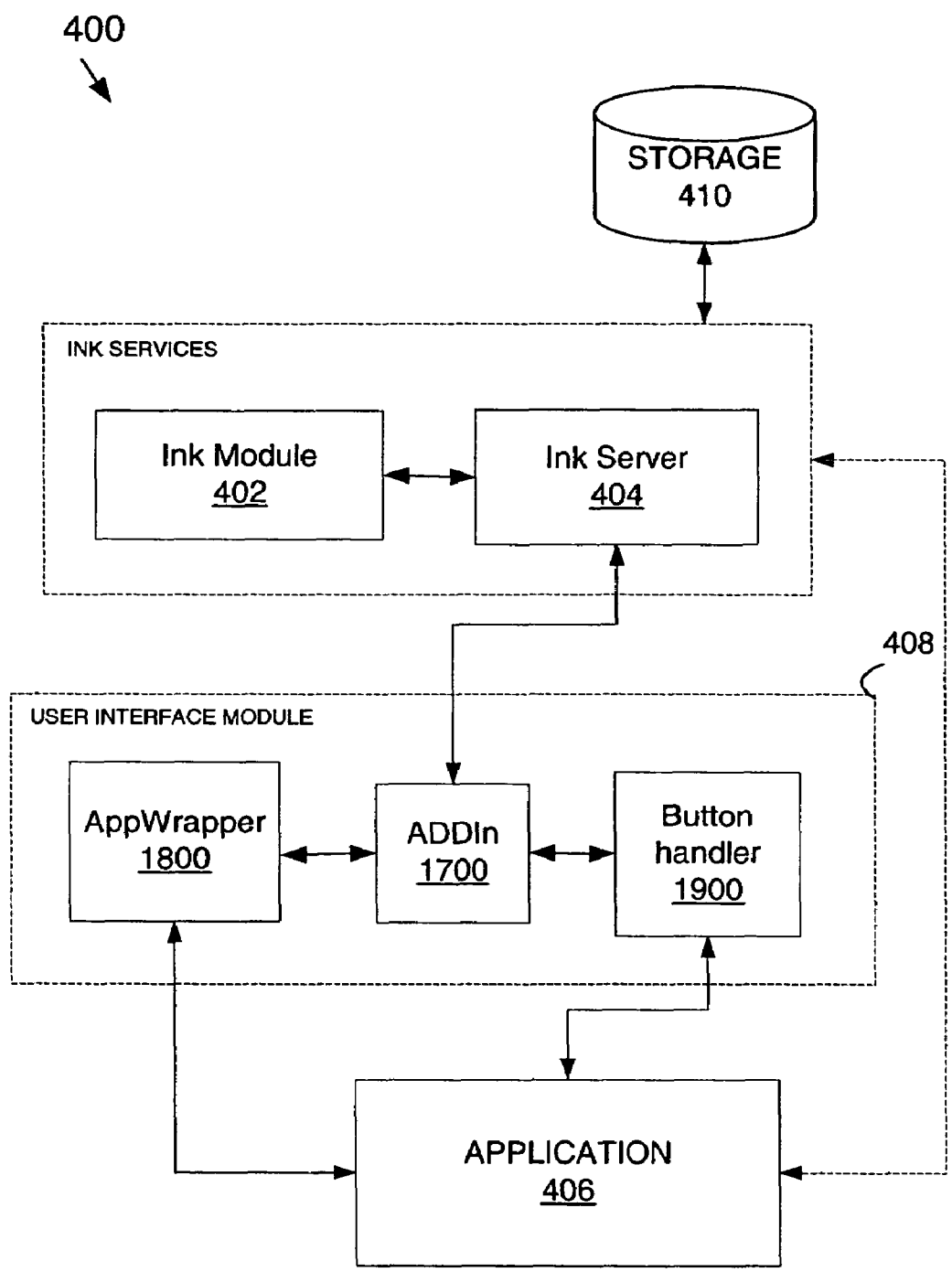
FIG. 4 is a schematic block diagram of a system for providing an ink environment in accordance with aspects of the present invention.

FIG. 4 illustrates a schematic diagram of one example of a system useful for implementing an ink environment within an application program. As illustrated, the system 400 includes an Ink Module 402 which provides functionality and services to an Ink Server 404. According one aspect, Ink Server 404 may communicate directly with the container ink application 406. Alternatively, Ink Server 404 may communicate with a user interface module 408 to provide more usability and access of the features of the ink environment. The system 400 may be embodied in general computing environment 100 shown in FIG. 1 or embodied in pen-based computing environment 201 as illustrated in FIG. 2.

With continued reference to FIG. 4, Ink Module 402 provides interfaces which are functionally associated with methods for the storage and manipulation of ink. Ink Server 404 communicates with a container ink application 406 to provide interfaces for user interaction with ink words or other ink data in the contained ink object. In one aspect, the interfaces are used through which container ink applications can communicate with their contained ink objects. In general as used herein, an interface is a set of methods, which abide by certain input, output, and behavior rules. The container ink application, such as the electronic mail application, does not directly access the methods, but communicates via the interfaces. It will be appreciated that the interfaces are also part of the OLE technology. In one aspect, Ink Module 402 exposes interfaces such as an Ink interface 1100, and an Ink Event interface 1200. The interfaces of Ink Module 402 can be used by the Ink Server 404.

Figure 5:
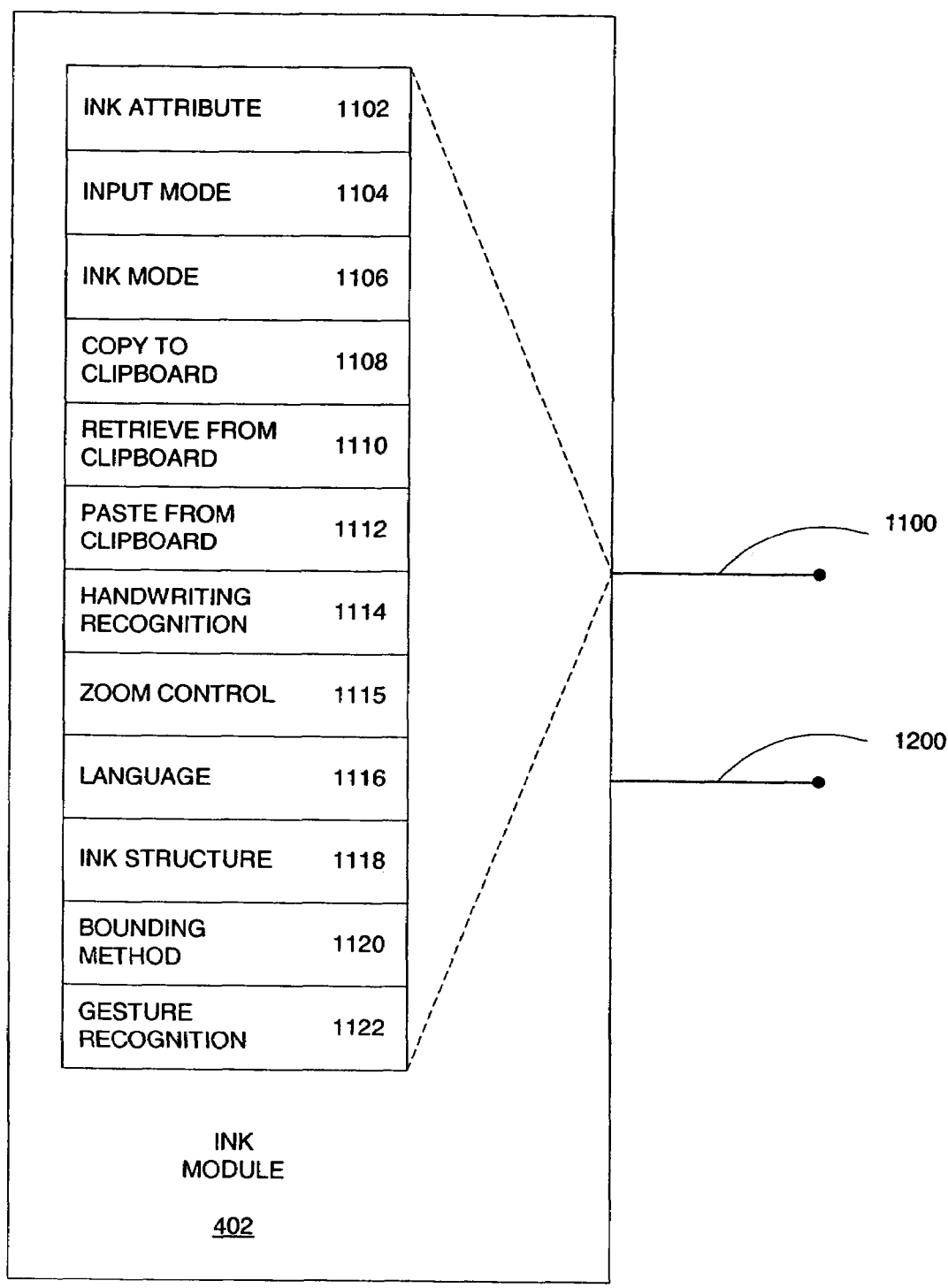
FIG. 5 is a schematic representation of a computer executable module with interfaces and methods of the system shown in FIG. 4.

As shown in FIG. 5, ink interface 1100 of Ink Module 402 may have methods which include retrieving and setting ink attributes 1102 such as bold, italics, color, and ink line thickness and the like. In addition, Ink Interface 1100 may provide methods to retrieve and set input modes 1104 for the ink environment. One input mode may include an inking mode associated with pen down action and pen up action. Another input mode may include a selection mode associated with the selection of ink words or the ink data in the ink environment. The selection mode may include data for dragging a box around ink strokes for a selection. The selection mode may also include whether a lasso selection is occurring with a lasso select tool that allows a user to flexibly select a plurality of ink words that are not arranged in a straight line. Yet another input mode may include a highlighting mode for highlighting of ink words or other ink data in the ink environment. In the highlighting mode, highlighting ink is laid down in the ink environment. Ink Interface 1100 may also provide methods for inking mode settings 1106 such as pressure sensitivity of the pen-computing environment 201 and pen tip style or stylus tips. To provide functionality for clipboard operations, Ink Interface 1100 may include a methods 1108–1112 of a selection of ink words or other ink data to be copied into memory, such as a clipboard 410, retrieved from the clipboard 410, and pasted from the clipboard 410. These methods 1108–1112 allow a user to cut and paste ink words or other ink data between application programs in a graphical environment on general purpose computer 100 and pen-based computer 201. Optionally, Ink interface 1100 may include method 1114 for converting the ink words into text words based on handwriting recognition for use by non-native ink applications.

With continued reference to FIG. 5, other methods of Ink Interface 1100 may include visual feedback operations 1115, such as zoom in and out control of the ink environment 304 (see FIG. 3). In addition, Ink interface 1100 may include a method for world language 1116 interrogation so that the menus and other items of the graphic environment matches the local language of a user of system 100 or 201. Ink interface 1100 may include a method for classification of a contained ink object into a hierarchical structure 1118 reflecting a semantic relationship of the ink written in the ink environment. For example, this semantic relationship of ink strokes within ink environment may include a parsing system operable with the operating system as shown the FIGS. 1 and 2 to determine ink words, lines, or paragraphs.

To provide control of resizing and repurposing the ink environment, Ink Module 1100 provides a bounding function 1120 to return the size of the ink collected. The bounding function can prevent a user from making the ink environment (when in a rectangular display region) smaller than the ink it contains so that the visual display is appropriate. In addition, the bounding function translates and scales the existing ink words to be rendered visually within the rectangular display region. In one aspect, the ink is moved so the top-left corner of the ink's bounding box corresponds to the top-left corner of display region and then the ink can be resized so that the bottom-right corner corresponds to the bottom-right corner of display region. Further Ink Interface 1100 may include a method 1122 for gesture recognition in a pen-based computing environment 201, for example a "press and hold" gesture. With continued reference to FIG. 5, Ink Event Interface 1200 can send various system events and other system notifications to the Ink Server 404.

Figure 6:
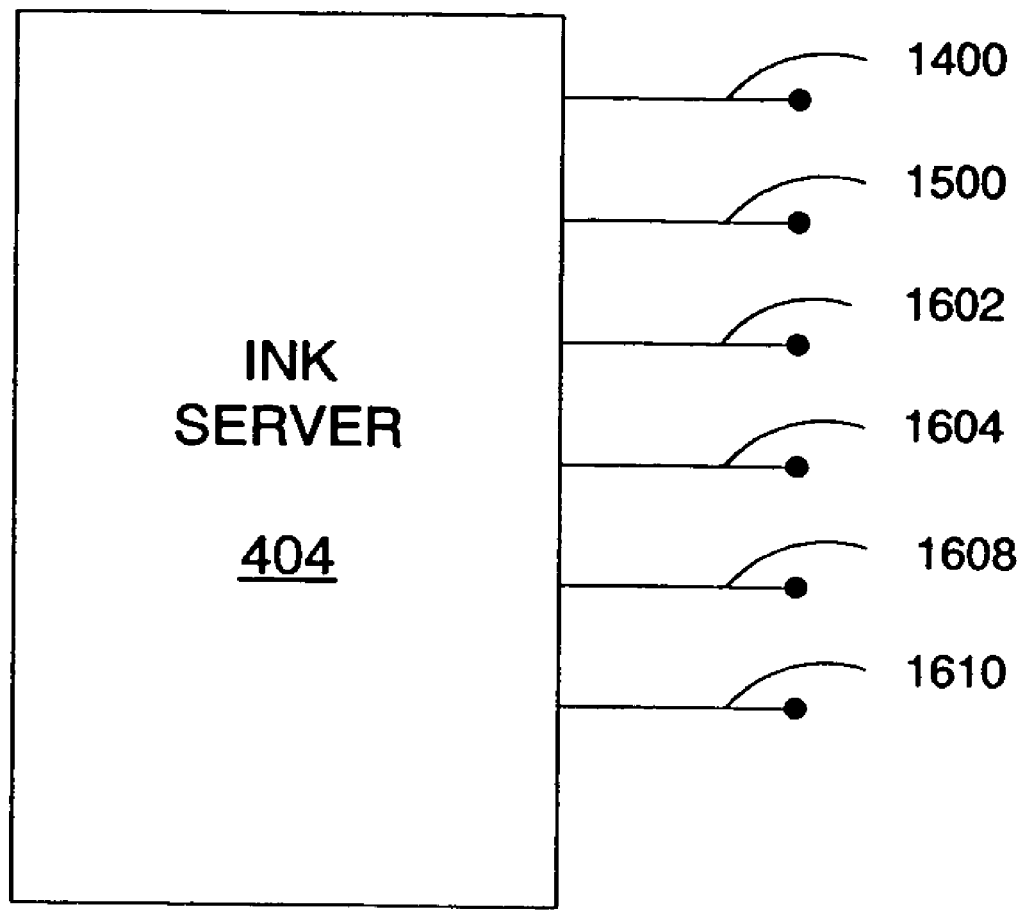
FIG. 6 is a schematic representation of another computer executable module with interface and methods of the system shown in FIG. 4.

Referring to FIG. 6, Ink Server 404 may expose interfaces, such as an InkDoc interface 1400, and an InkDoc Event interface 1500 to a container ink application or user interface module 408. Interface 1500 may send events associated with context menus related to user interface module 408 that have been invoked or otherwise selected by the user. InkDoc interface 1400 of Ink Server 404 hosts the functions of Ink Module 404 for communication with the container ink application as an OLE server. As an OLE server, Ink Sever 404 may include standard OLE interfaces which provides methods through which container ink applications can access Ink Server 404. Accordingly, Ink Server 404 may support an IUnknown interface 1602. Container ink application may use the IUnknown interface 1602 to determine which other interfaces the object supports. The implementation of IUnknown interface 1602 knows what other interfaces the Ink Server 404 supports and returns to the invoking application pointers to those interfaces for the OLE environment. Interfaces 1604 through 1610 are examples of typical interfaces that can be supported by an object. These interfaces follow from the IUnknown interface. For example, the IDataObject interface 1604 provides methods for storing data in and retrieving data from the object. The IPersistStorage interface 1608 provides methods for storing the contained ink object to and retrieving the container ink object from persistent storage. The IOLEObject interface 1610 provides methods through which a container ink application invokes the functionality that corresponds to a user-selected action. It will be appreciated that ink module 402 may include the standard OLE interfaces as well for an OLE implementation.

Turning to FIG. 4, user interface module 408 can provide additional user integration into application programs for the ink environment. In one aspect, user interface module 408 may provide menu items and toolbar buttons into the application program for the ink environment. User interface module 408 may includes a component object model (COM) addin 1700. The COM addin 1700 provides negotiation for the user interface module 408 to insert visual command buttons, menu items, and toolbars for interacting with the user to insert the ink environment into the application 406. In another aspect, user interface module 408 may include interfaces which are exposed to provide enhanced functionality of the ink environment 304 in a container ink application program 406. For example, an Application Wrapper Interface 1800 (AppWrapper) may used to negotiate with via Ink Server 404 via Addin 1700 for inserting an inking environment directly into a host application at an insertion location on the display surface 204. Each host application may have individual AppWrapper interfaces. AppWrapper interface 1800 may provide for specific event notification from the host application for the user interface module 408 and the notifications can be then communicated to Ink Server 404 via Addin 1700. For menu item selection by a user, a button handler interface 1900 may be provided by the user interface module 408. Events from Button handler 1900 are provided to Addin 1700. For example, the buttons on the menu of the ink environment when clicked or selected, create events that can be mapped for launching various command associated with services for the manipulation and collection on ink. The commands relate to the previously described methods provided by the Ink Server 404 and/or Ink Module 402. The host applications programs 196 (see FIG. 1) can include, but are not limited to a word processing program, a presentation graphics program, a spreadsheet program, or an electronic mail program, a gaming program, and the like.

In the example system 400, Ink Module 402, Ink Server 404, and/or User Interface Module 408 can be stored in the general purpose computing environment 100 (FIG. 1) or pen-based computing environment 201 as executable program files (with a ".exe" file name extension) or as a dynamic link library file (with a ".dll" file name extension). Dynamic link library files are loaded, dynamically linked, and executed by the WINDOWS® operating system. Executable program files are loaded by the operating system as a separate executing process. The example ink environment, Ink Server 404 and Ink Module 402 provide ink services as an extension of a standard set of OLE services. Accordingly, the container ink application realizes events using services provided by the ink environment via Ink Server 404 and/or Ink Module 402 for ink services of the present invention; and OLE services for standard OLE services and a set of standard object interfaces defined by COM. In a one implementation, the standard OLE services and COM are available to container ink application as application programming interface (API) functions provided in a COM/OLE library, a component of the WINDOWS® operating system.

Ink Environment Behaviors

The ink environment with ink words or other ink data (contained ink object) can have at least three independent states—a non-selected state or inactive, a selected state, and an activated state for receiving and manipulation of ink. In keeping with the functions provided by the Ink Module 402, and/or Ink Server 404, shown in FIG. 4, the contained ink object among other operations, can be resized, deleted, moved around, formatted, and copied and pasted among container ink applications of the present invention. The user has control as to the three states of the ink environment by using various actions with an input device. For example, the user may click or tap within a region of the ink environment when in-active so that environment becomes active to receive ink. Nevertheless, there are numerous user interactions can place for ink environment in three states.

Figure 7:
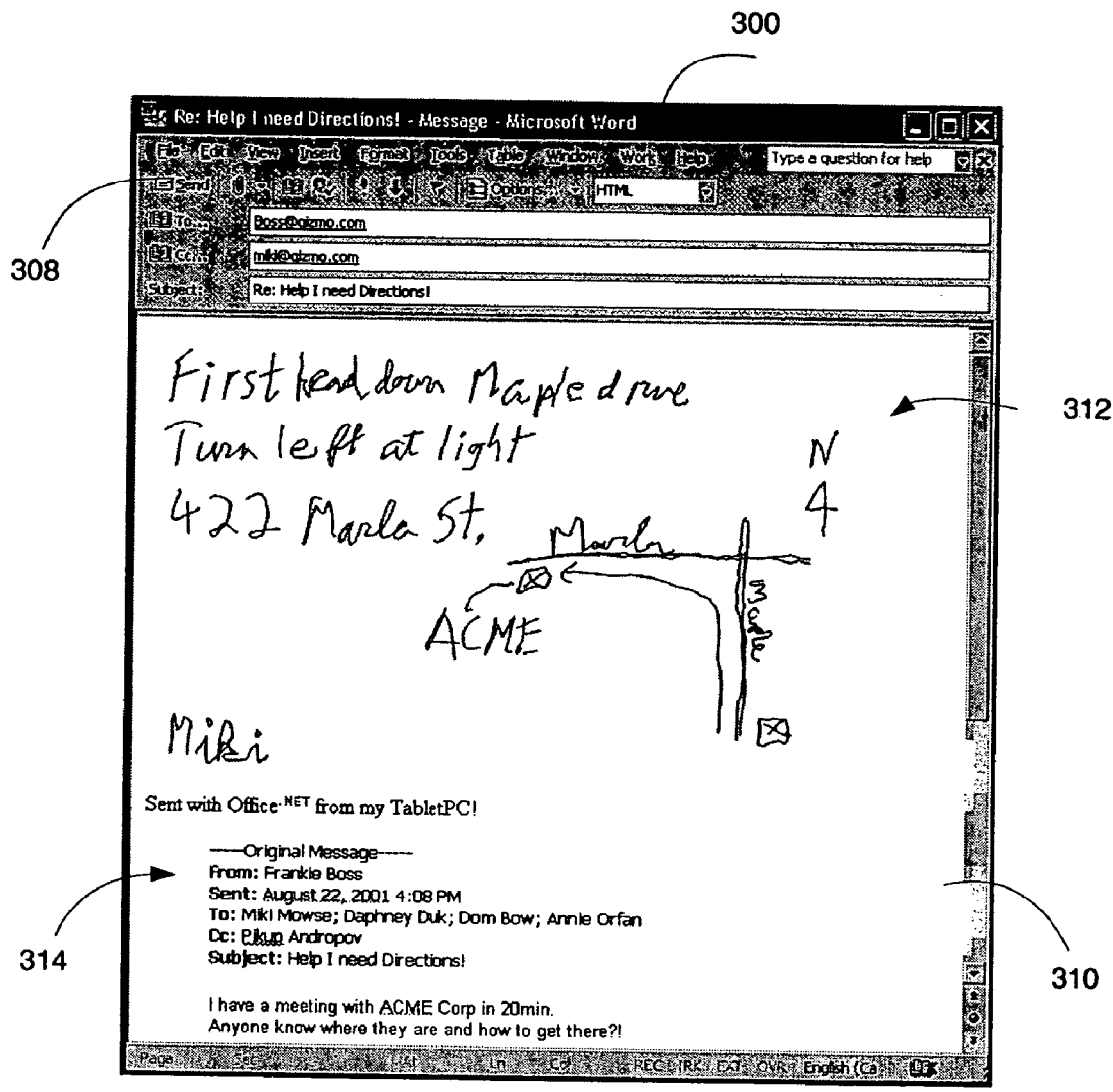
FIG. 7 is a schematic representation of an example of a compound ink document as it appears in a non-selected or static state within an ink environment in accordance with aspects of the present invention.

FIG. 7 illustrates a schematic diagram of one example of a contained ink object as it appears in a non-selected or static state as implemented with system 400 within a container ink application 406, such as an electronic mail program. The container ink application 300 graphical display shows a menu bar 308, and a working region 310. The menu bar 308 may be a native menu bar associated with the container ink application. The ink words 312 may be rendered in a metafile representation as graphical ink objects along with the text words 314 in the working region 310. The ink words 312 appear in a placeholder state along with the text words 310 without indication as a separate component, e.g., a transparent ink environment. In the example in FIG. 7, the ink words may be contained ink objects. In the non-selected state, the ink words are generally rendered in a normal contrast mode. Alternatively, the ink words can be rendered in a high contrast mode for enhanced user viewing.

In a selected state (not-shown), the container ink object is inactive for receiving and manipulating ink. In the working region 310, the ink environment is graphically indicated with a rectangular region on the boundary and resizing handles. Of course, the ink environment could be represented in other ways, such as a freeform area. The menu bar 308 for the container ink application 300 remain unchanged.

Figure 8:
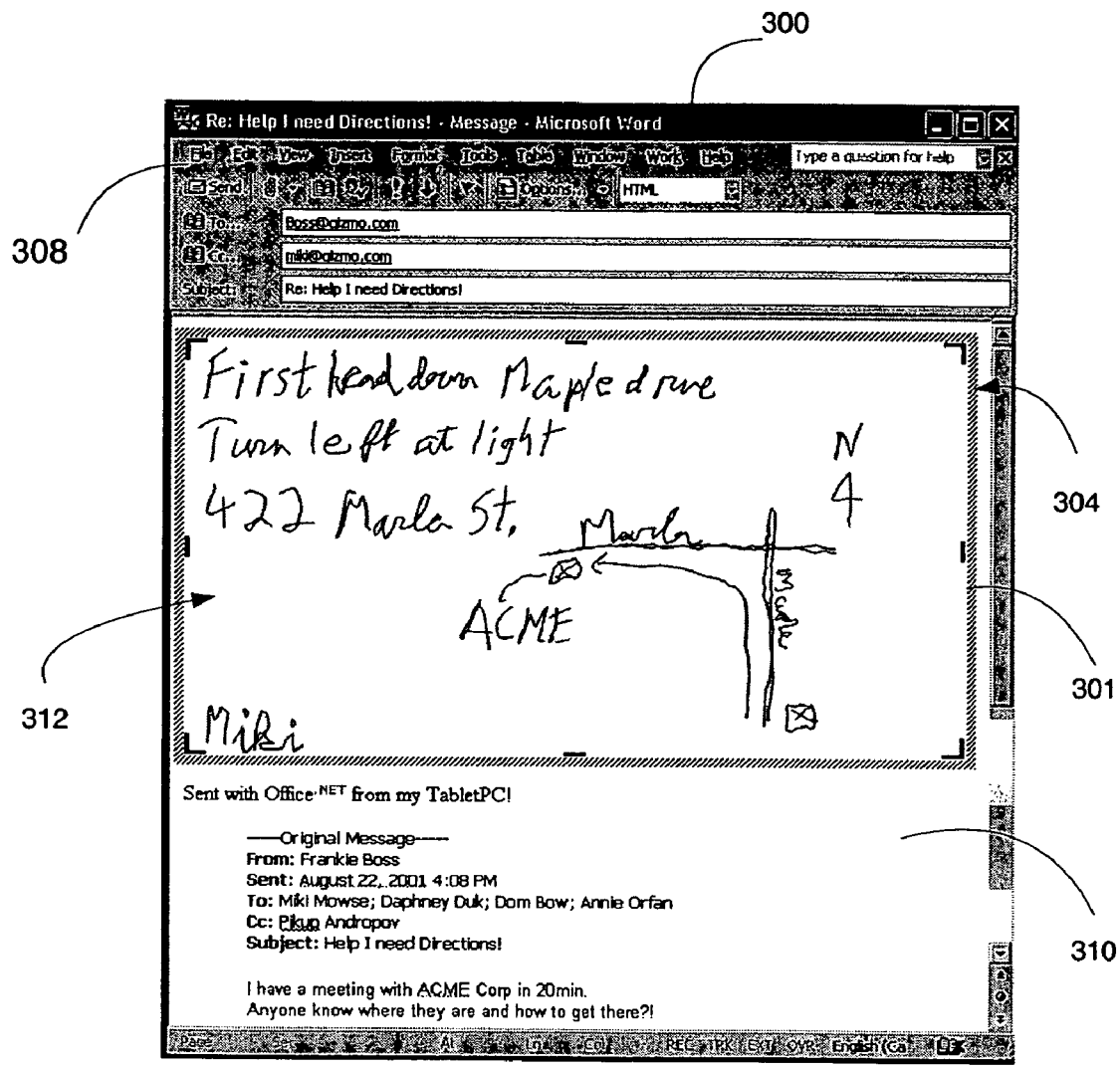
FIG. 8 is a schematic representation of a compound ink document illustrated when edited within a container application program in an activated state ink environment for in-situ usability in accordance with aspects of the present invention.

FIG. 8 illustrates the compound ink document illustrated as it appears when edited within the electronic mail program in an activated state for in-situ usability. In the activated state, the ink environment 304 is configured to receive digital ink input and provide a full complement of ink services from system 400 (see FIGS. 4–6). Accordingly, the user has freedom to writing anywhere in the environment, and in any orientation. The container ink application 300 display may include menu bar 308, and a working region 310. The compound ink document contains embedded ink environment 304. In the example shown, the electronic mail application, as the container ink application 300, may request that ink server 404 provide manipulation of ink words 312 or other ink services. The ink server 404 negotiates with the electronic mail application to interact with the ink environment 304. If desired, the title bar may be changed to reflect that the ink environment is implementing the compound ink document. Various aspects of the ink environment 304 may be visually changed to provide user feedback that it is being activated in-situ within its compound ink document. Accordingly, a selection highlight 301 in the form of a hatched border pattern and selection handles can be placed around the ink environment 304 to provide a visual feedback for the user.

In one arrangement of in-situ operation, the ink environment 304 may provide and display graphical lines (not-shown) as guides for inking. The lines may be drawn with a predetermined color & width. The lines may be drawn at predetermined intervals between the lines. Of course, the user is not restricted to writing ink within the displayed lines and can still applied ink in any desired orientation. It will be appreciated that a border, such as a selection highlight, surrounds these lines indicating the rectangular region is active for inking. While the lines and border can appear when the ink environment is in the active state, a user has selective control not display the lines and border. It will be appreciated that the line direction can be vertical or horizontal in the ink environment and may be selectively toggled by the user.

Figure 9:
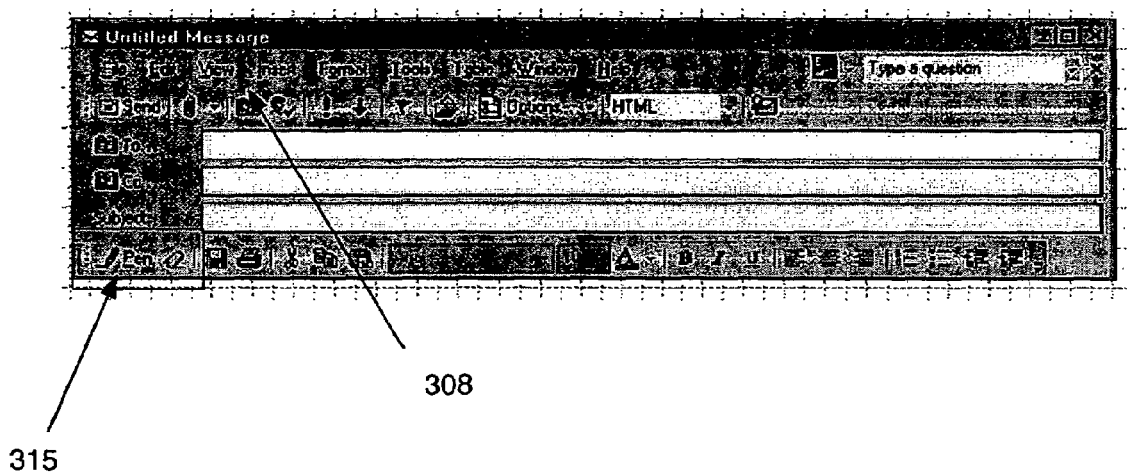
FIG. 9 is a schematic representation of a tool bar for the ink environment in accordance with aspects of the present invention.

In one arrangement of the invention, when the user edits the native text words of the compound ink document, the menu bar 308 includes the commands to interact with text words within the container ink application. Likewise, when the user edits the ink words or interacts within the ink environment 304 of the compound ink document, the menu bar 308 is provided with an ink toolbar 315, for example, shown in FIG. 9. The user interface module 408 (see FIG. 4) can provide the features of ink tool bar.

Figure 10A:
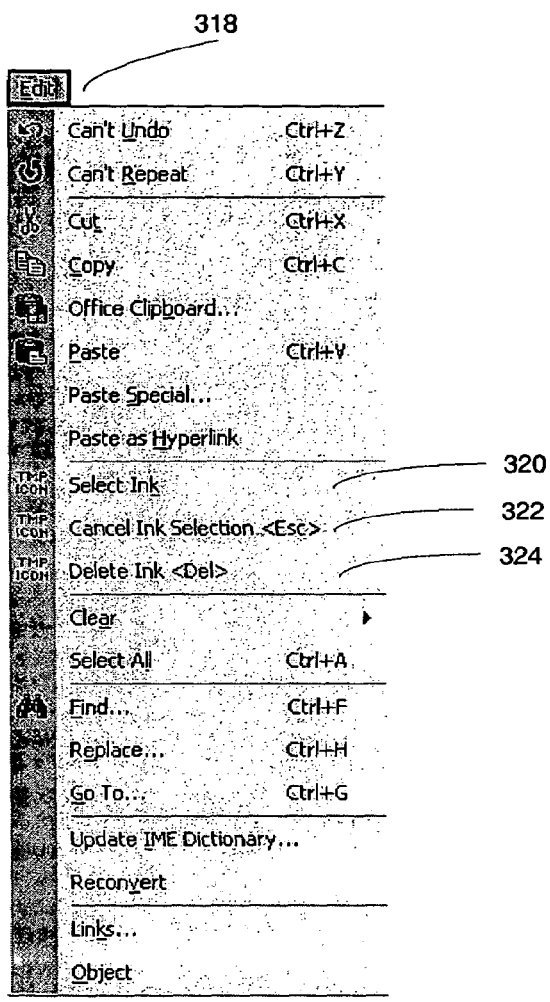
FIGS. 10A and 10B are schematic representations of menu items for an ink environment in accordance with aspects of the present invention.
Figure 10B:
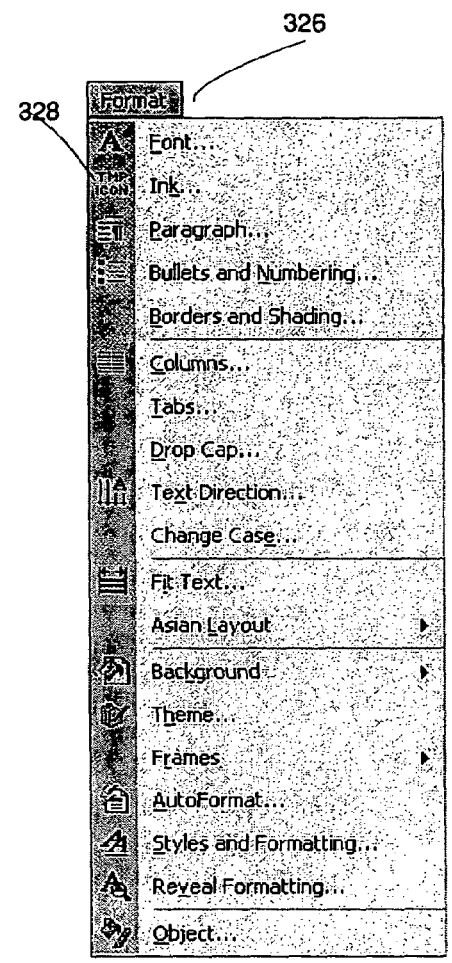
Figure 11:
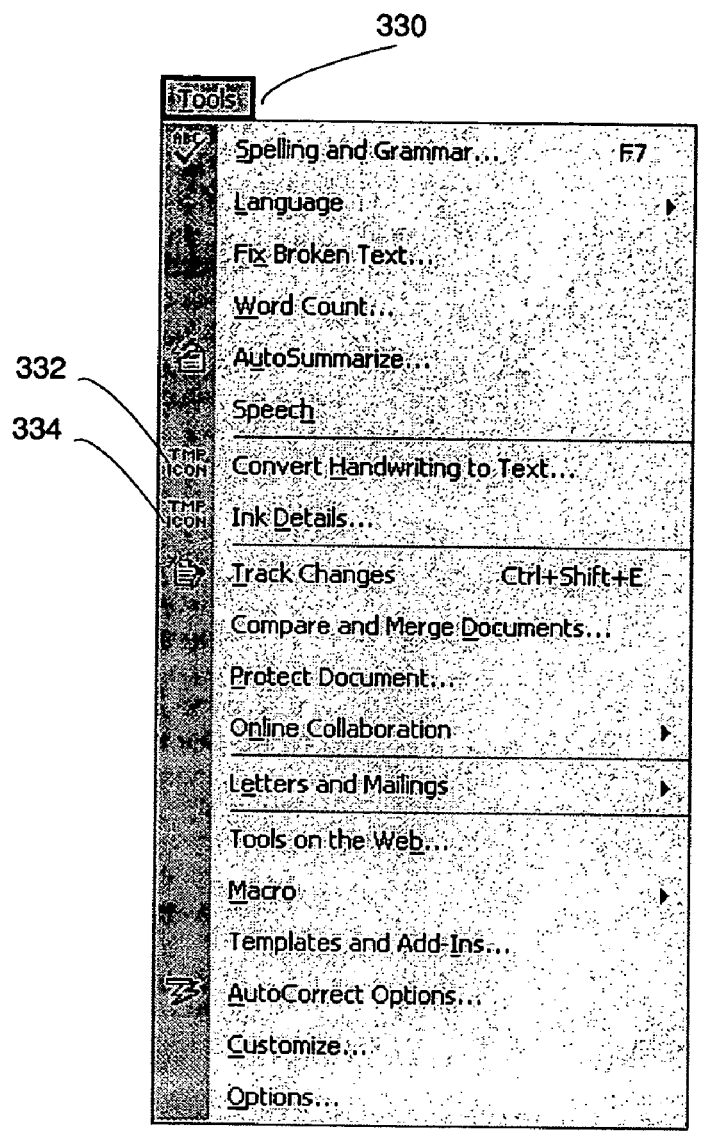
FIG. 11 is a schematic representation of other menu items for an ink environment in accordance with aspects of the present invention.

In one aspect, ink menu items are seamlessly synthesized with the container ink application menu to form a synthesized ink menu. FIGS. 10A, 10B and 11 illustrate example menu presentations associated with the ink environment 304 (see FIG. 8). Purely by way of example without limitation of the invention, in FIG. 10A, a menu command "Edit" 318 can have ink specific functions such as Select Ink 320, Cancel Ink Selection 322, Delete Ink 324. Likewise in FIG. 10B, the menu command "Format" 326 can have yet other ink specific functions, such as Format Ink 328. Turning to FIG. 11, the "Tools" 330 menu command may include a Convert Handwriting to Text 332 function and Ink Details 334 function. It will be appreciated that the specific locations of the menu items can be changed for usability and context of the functions. With reference to the Illustrative System Environment shown in FIG. 4, the ink menu items relate to the specific interfaces provided by Ink Module 402 and Ink Server 404 with the respective member functions.

Rendering Ink

Figure 12:
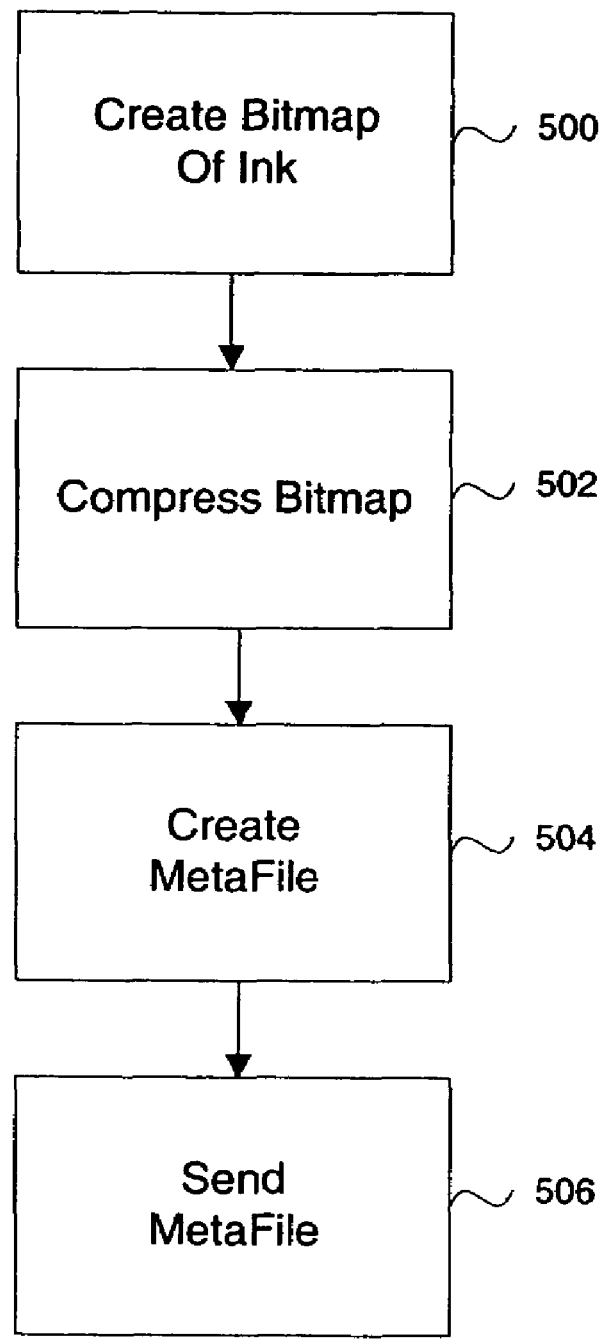
FIG. 12 is a general flow diagram for a process of preparing ink for display in accordance with aspects of the present invention.

FIG. 12 illustrates a diagram of one example of a generalized flow process of rendering ink in a non-selected or inactive ink environment within an application program. As previously discussed, the container ink application 406 can query the embedded ink environment for a metafile, which the container ink application visually displays as a placeholder when the ink environment is inactivate for receiving ink from handwriting. In one aspect, unlike traditional metafiles, ink can be rendered into a bitmap format. In a further aspect, the ink in a bitmap format can be antialiased to improve the visual appearance of the ink words or other ink data within the contained ink object. The Ink server 404 can implement the antialising function or a separate module in system 400. Accordingly in a computer executable process of rendering, in block 500, an 8 bit per pixel bitmap of the ink in the container ink object is created. In block 502, in order to reduce data storage and create antialising, the bitmap of the ink is compressed using a conventional run-length encoding (RLE) 8 compression algorithm. In block 504, a metafile is created which only has a single drawing record, the RLE 8 compressed bitmap. In block 506, the antialised metafile is provided to the container ink application for rendering. Accordingly, the ink is rendered in an improved visual form.

Ink Environment Insertion

Figure 13:
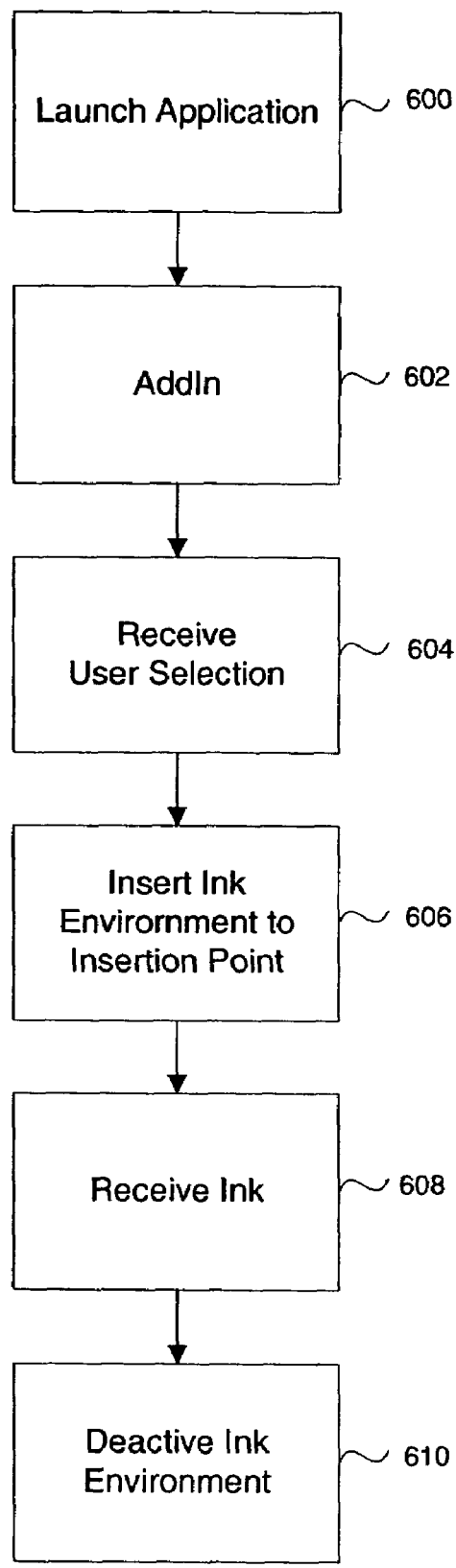
FIG. 13 is a general flow diagram of using an ink environment in accordance with aspects of the present invention.

FIG. 13 illustrates a diagram of a generalized flow process of providing an ink environment with an application program. In step 600, an application program is launched or otherwise executed in a conventional manner. For example, the user can select or click an icon associated with the application program. In one aspect of the invention, in step 602, during the launch of the application program, a component object model (COM) addin is loaded into the application environment. The COM addin provides interface connections to the user interface module 408 shown in FIG. 4. Accordingly, in step 602, the COM addin can provide negotiation with the user interface module 408 to insert visual command buttons and menu items for interacting with the user to insert the ink environment into the application. In step 604, the user can select a button function so as to insert the ink environment into the application work region 310 (see FIG. 3).

During the insertion in step 606, a rectangular region visually appears within the work region 310 of the launched application for indicating the ink environment. As previously noted, the ink environment 304 can have selection handles and a selection highlight bounding the rectangular region, thus indicating that it is activated. An ink toolbar may appear along with the ink environment. The cursor may change its context from a text word implementation to an ink environment implementation. For example, the cursor can change into a graphical ink dot similar to a pen tip for inking mode when hovering over the ink environment. Nevertheless, the cursor can graphically change context depending of the input mode, such as an eraser point for eraser mode. In step 608, once the ink environment is in-situ, the user can freely apply handwriting in ink and compose within the ink environment with the services provided by Ink Module 402 and/or Ink Server 404 shown in FIGS. 4–6. Once the user has finished composing and/or handwriting, in step 610, the user may then deactivate the ink environment from ink collection and manipulation. At this point, as previously noted, the ink environment will be visually displayed as the ink at the location on the screen and a metafile is created. Advantageously, the compound ink document can be shared or can be sent to other computing devices and/or application programs.

Example Use of Ink Environment

By way of example, an electronic mail application can be implemented with an ink environment therein. As previously mentioned, the electronic mail message body may have a contained ink object. The compound ink document, namely the message body with the contained ink object, can be sent to other users that have an email client. In one aspect, the compound ink document having the contained ink object can be sent in HyperText Markup Language (HTML). HTML is useful as an interoperability format because of its generalized acceptance as an industry standard and its ability to represent heterogeneous content. HTML is widely understood, well documented, and familiar to many skilled in the art. There are many tools for HTML production. Alternatively, the compound ink document can be transmitted in Rich Text Format (RTF), XML, generalize mark up languages, or plain text. Other formats are possible such as files saved in .doc format, .ppt format, and/or .xls, dealing with Microsoft WORD®, Microsoft POWERPOINT®, and Microsoft EXCEL®, respectively. The compound ink document may be converted to a PDF format for static viewing. In HTML format, the contained ink object can be generated an inline GIF representation of the ink from the ink environment. The GIF format provides good compression on various types of images and has wide acceptance. Nevertheless, the representation may be any image format such as, PNG, JPG, TIF, BMP, DIB, EMF, WMF and the like. In RTF, the ink environment can generate a metafile of the contained ink object that is viewable by conventional RTF readers or email client. While in plain text mode the ink is stripped and not transmitted, the ink words may be automatically converted to text words for display of on receiving email client.

Summarization of the In-Situ Ink Environment

An ink environment provides features for a user to interact with embedded or linked ink words or other ink data within a compound ink document. The ink environment can be made accessible to the user through the window environment of an application that operates with the compound ink document. Advantageously, the user is provided with the freedom to input digital ink so they can write anywhere in the ink environment, in any orientation, and using any desired stroke size provided by the ink environment. In one aspect, the ink environment can have a state for in-situ user interaction and manipulation in a computing environment, for example a pen-based environment. In one aspect, the ink environment can be enabled with the ink menu items that are seamless synthesized with the menus of the application that implements the compound ink document. Advantageously, the ink environment can be provided to non-native ink applications to create independent ink services for sharing between different applications and transmission over networks to remote users. In other embodiments, the ink environment may be provided by an ACTIVEX® control by MICROSOFT® Corporation. In some aspects of the present invention, a metafile is provided with antialiasing support to improve the visual appearance of ink.

Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A computer system for providing an ink environment in a computer readable application program, comprising:
   means for interfacing with a container ink object for one of ink collection and manipulation by an input device;
   means for processing an application program configured to interface with the container ink object; and
   means for transforming collected ink strokes of the container ink object into a pixel bitmap; compressing the pixel bitmap to form a compressed bitmap; and creating a metafile with only a single drawing record using the compressed bitmap for displaying the ink strokes.

2. The computer system in accordance with claim 1, in which the means for interfacing includes receiving least one ink attribute for the container ink object for visual indication of the ink collection and manipulation.

3. The computer system in accordance with claim 2, in which the at least one ink attribute is selected from a group comprising a bold attribute, an italics attribute, a color attribute, and a stroke thickness attribute.

4. The computer system in accordance with claim 3, in which the means for interfacing includes receiving at least one input mode for the container ink object, the at least one input mode being selected from a group comprising an inking mode, a selection mode, and a highlighting mode.

5. The computer system in accordance with claim 3, in which the means for interfacing includes receiving input for sending ink within said container ink object to a computer readable storage.

6. The computer system in accordance with claim 3, in which the means for interfacing includes receiving input for retrieving ink from a computer readable storage.

7. The computer system in accordance with claim 3, in which the means for interfacing includes receiving input for zoom control of the ink within the container ink object.

8. The computer system in accordance with claim 3, further including means for providing at least one graphical menu item associated with the container ink object when in an activated state, said at least one graphical menu item being operable with the application.

9. The computer system in accordance with claim 3, further including means for providing a graphical toolbar associated with the container ink object when the container ink object is in an activated state, said graphical toolbar being operable with the application.

10. The computer system in accordance with claim 3, in which the application is selected from a group comprising a word processing application; an electronic spreadsheet application; and a messaging collaboration application.

11. The computer system in accordance with claim 3, in which means for interfacing includes receiving input for a semantical relationship of ink strokes within the container ink object.

12. The computer system in accordance with claim 3, further including means for transmitting the container ink object to a remote computer.

* * * * *